May 5, 1953     E. N. MEYER ET AL     2,637,586
HITCH AND GRILL GUARD ATTACHMENT FOR TRACTORS
Filed May 19, 1950     2 SHEETS—SHEET 1
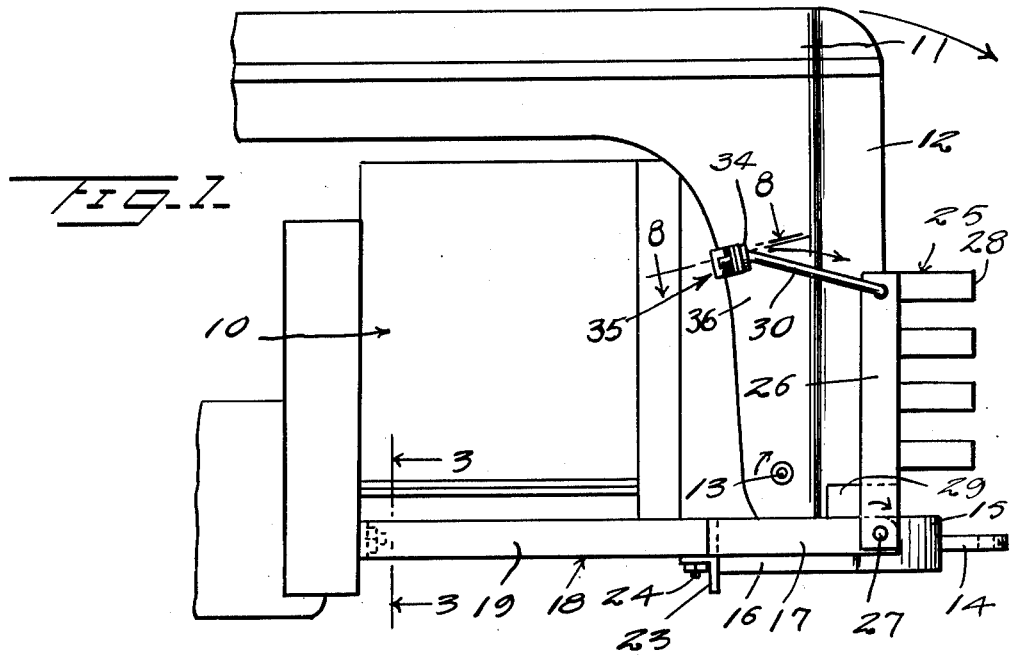
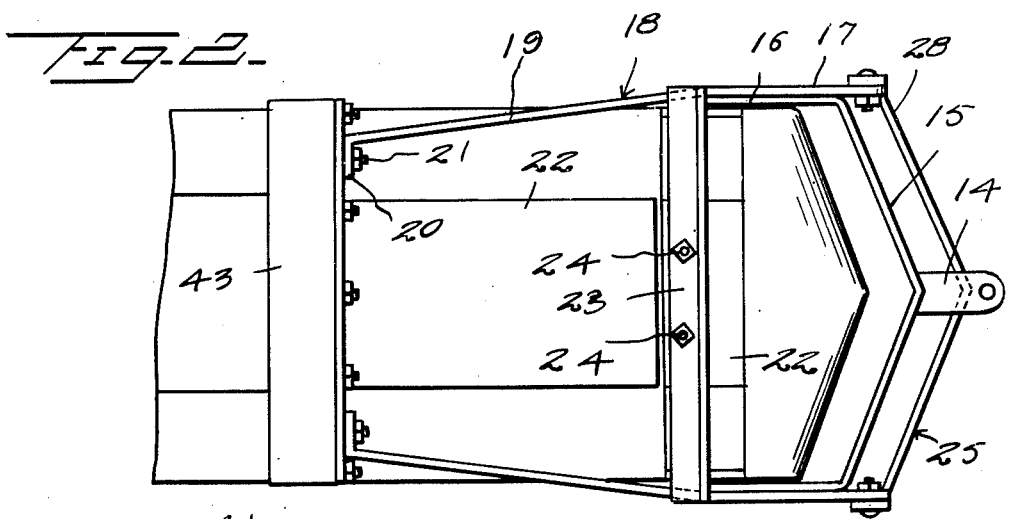
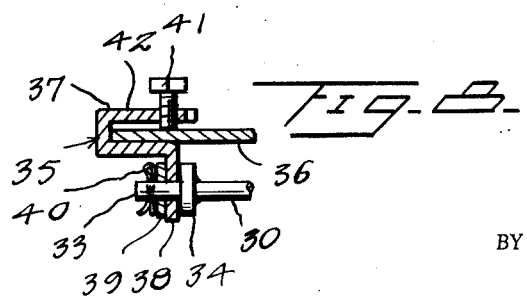
INVENTORS
E. N. Meyer
H. J. Steiner
BY Kimmel & Crowell
ATTORNEYS

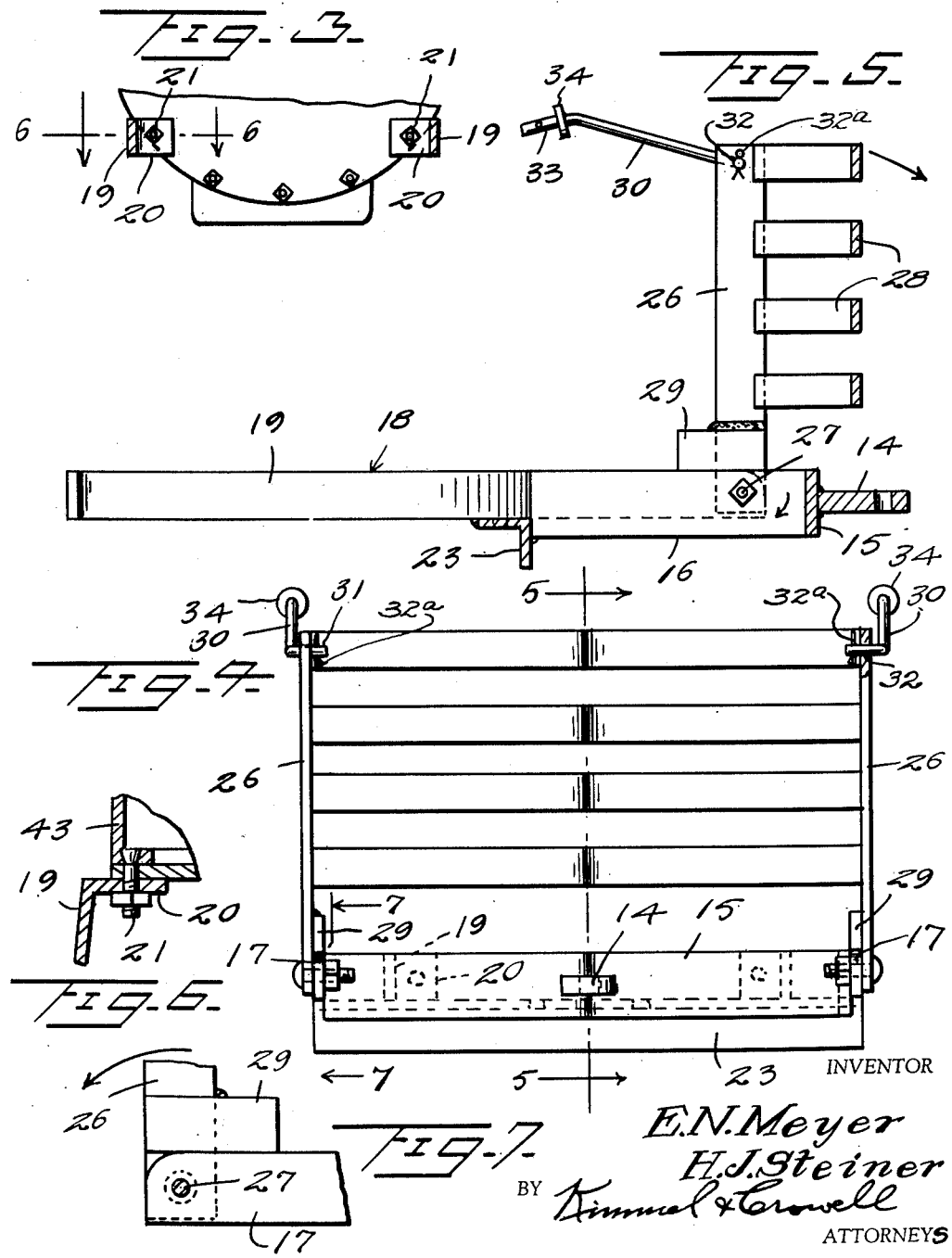

Patented May 5, 1953

2,637,586

UNITED STATES PATENT OFFICE 2,637,586

HITCH AND GRILL GUARD ATTACHMENT FOR TRACTORS

Edward N. Meyer, Ada, and Harold J. Steiner, Pandora, Ohio

Application May 19, 1950, Serial No. 162,930

2 Claims. (Cl. 293—69)

This invention relates to an attachment in the form of a hitch which is adapted to be mounted on the front of a tractor and also includes a grill guard for protecting the grill at the front of the tractor.

An object of this invention is to provide an attachment of this kind which is secured beneath the engine of a tractor and projects forwardly therefrom, the attachment also including an upwardly projecting grill which is pivotally secured at its lower end to the hitch structure so that the hood and grill forming part of the tractor may be swung upwardly and forwardly.

A further object of this invention is to provide an attachment of this kind which is of simple construction and can be readily mounted on a conventional tractor.

With the above and other objects in view, my invention consists in the arrangement, combination and details of construction disclosed in the drawings and specification, and then more particularly pointed out in the appended claims.

In the drawings:

Figure 1 is a detailed side elevation of the front portion of a tractor having a hitch and grill guard constructed according to an embodiment of this invention.

Figure 2 is a bottom plan view of the device.

Figure 3 is a fragmentary sectional view taken on the line 3—3 of Figure 1.

Figure 4 is a detailed front elevation partly broken away and in section of the attachment.

Figure 5 is a sectional view taken on the line 5—5 of Figure 4.

Figure 6 is a fragmentary sectional view taken on the line 6—6 of Figure 3.

Figure 7 is a fragmentary sectional view taken on the line 7—7 of Figure 4.

Figure 8 is a fragmentary sectional view taken on the line 8—8 of Figure 1.

Referring to the drawings, the numeral 10 designates generally the engine of a tractor of conventional construction having a hood 11 extending thereover and formed with a depending grill structure 12 which is pivotally mounted as at 13 on the forward end of the tractor frame structure. The hood with the grill 12 is adapted to swing upwardly and forwardly so that the engine can be readily worked upon as may be desired.

A hitch lug 14 is disposed at the front of the tractor and is fixedly secured to the apex of a V-shaped bar 15 which has extending from the opposite ends thereof rearwardly projecting parallel bars or arms 16, and the bars 16 have fixed thereto the forward parallel ends or links 17 of a pair of rearwardly projecting supporting bars generally designated as 18. The supporting bars 18 include inwardly inclined sections or bars 19 which are integral with the bars 17, and the rear ends of the bars 19 are bent inwardly as indicated at 20 so that one of the fly wheel housing cap screws 21 may be extended through the lug or extension 20 in order to secure the rear ends of the bars 19 to the engine structure.

The tractor also includes a front motor support 22 shown in bottom plan in Figure 2, and a transversely disposed angle shaped connecting bar 23 is fixed between the supporting bars 18 and secured to the bottom of the support 22 by fastening members 24. A grill generally designated as 25 is pivotally secured to the forward ends of the supporting bars 17 and includes a pair of upright bars or standards 26 which are pivotally secured as at 27 to the bars 17.

The upright bars 26 have fixed thereto vertically spaced apart V-shaped grill forming bars or brackets 28, and the grill structure 25 is limited in its rearward swinging by means of a pair of plates 29 which are fixed to the inner sides of the uprights 26 and engage the upper edges of the supporting bars 17. The grill structure 25 is coupled at its upper end to the hood structure by means of a pair of links 30 which are formed with right angle extensions 31 at their forward ends extending loosely through openings 32 formed in the uprights 26 and secured therein by cotter pins 32a to permit limited pivotal movement of rods 30 and hence hood 11 relative to uprights 26, when the parts are swung about their respective pivots 13 and 27. This may be effected by loosening of set screw 41, to be described hereinafter.

The bars 30 are also formed with obtusely disposed rear extensions 33, and a collar 34 is fixedly secured to the forward end of each extension 33. A clamping member generally designated as 35 is secured to the sides 36 of the grill structure 12 at the rear of the latter, and each clamp 35 includes a U-shaped member 37 which engages about the side 36 and is formed at one end thereof with a right angular lug or extension 38 through which the extension 33 loosely engages. The lug 38 is held on the extension 33 by means of a ring or collar 39 and a cotter pin 40 or other suitable fastening means.

The clamp 35 is firmly secured to the side member 36 by means of a bolt or set screw 41 which is threaded through the inner leg 42 of the U-member 35. In the use of this attachment, the supporting members 18 are bolted by means of the fly wheel cap screws 21 to the fly wheel housing 43. The cross bar 23 is bolted by means of the bolts 24 to the lower side of the motor support 22 so that the hitch lug 14 will be disposed in forwardly projecting position at the front of the tractor. The grill strucure 25 is normally disposed in substantially a right angular position with respect to the supporting structure for the hitch lug and is clamped to the hood structure by means of the clamps 35. This hitch and grill guard structure can be mounted on certain types of tractors and will provide a means whereby an implement may be connected to the front of the tractor for pushing the implement over the ground.

The guard structure 25 will provide a protective means for the grill of the hood structure, and by reason of the pivoted mounting of the guard structure, the hood may be swung upwardly and forwardly without interference from the guard structure. This hitch being free of the front axle will not have to be removed when the two front wheels of the tractor are adjusted toward or away from each other.

What is claimed is:

1. In a grill guard for mounting on the front of a tractor having a hood pivoted at its forward lower end, a V-shaped bar provided with rearwardly extending spaced parallel arms, a link secured to each of said arms and including a rearwardly converging section, the rear ends of said sections being bent inwardly for the projection therethrough of a securing element, a horizontally disposed angle iron extending between said links and secured thereto, a grill pivotally connected to the front end of said links and including a pair of spaced parallel upright standards, a plurality of spaced parallel V-shaped brackets extending between said standards and secured thereto, links pivotally connected at one end to the upper ends of said standards, and a clamp connected to the rear end of each of said links securing said links to the tractor hood.

2. In a grill guard for mounting on the front of a tractor having a hood pivoted at its forward lower end, a V-shaped bar provided with rearwardly extending spaced parallel arms, a link secured to each of said arms and including a rearwardly converging section, the rear ends of said sections being bent inwardly for the projection therethrough of a securing element, a horizontally disposed angle iron extending between said links and secured thereto, a grill pivotally connected to the front end of said links and including a pair of spaced parallel upright standards, a plurality of spaced parallel V-shaped brackets extending between said standards and secured thereto, links pivotally connected at one end to the upper ends of said standards, and a clamp connected to the rear end of each of said links, each of said clamps including a U-shaped member for engagement with a portion of the tractor hood.

EDWARD N. MEYER.
HAROLD J. STEINER.

References Cited in the file of this patent

UNITED STATES PATENTS

| Number | Name | Date |
| --- | --- | --- |
| 2,399,810 | Ketcham | May 7, 1946 |
| 2,537,553 | Schonauer | Jan. 9, 1951 |